United States Patent Office 3,355,520
Patented Nov. 28, 1967

3,355,520
POLYOLEFIN BLENDS CONTAINING FREE-RADICAL ETHYLENE POLYMERS AND MINOR AMOUNTS OF ISOTACTIC POLYPROPYLENE
Daniel Edwin Maloney and Richard Watkin Rees, Wilmington, Del., assignors to E. I. du Pont de Nemours and Company, Wilmington, Del., a corporation of Delaware
No Drawing. Filed Apr. 17, 1964, Ser. No. 360,764
1 Claim. (Cl. 260—897)

This application is a continuation-in-part of Ser. No. 92,459, filed Mar. 1, 1961 and now abandoned.

This invention relates to blends of coordination polymerization polypropylene and free-radical polymers of ethylene.

Polyolefins, and in particular polyethylenes, of both the branched and highly linear variety, are of commercial interest because of their comparatively low cost and widespread usage in a vast number of applications. However, certain processing limitations are inherent in either variety and it is highly desirable to modify these polymers to increase their potential in certain applications, e.g., in wire and cable coating, paper coating, the preparation of films and the production of objects by blow-molding. It has been found that certain process difficulties may be obviated by blending polypropylene made by coordination catalysis with free-radical branched polymers of ethylene. The blend thus obtained exhibits superior film-forming properties, bubble stability in blown film processes, improved transition viscosities between the melt and solid phases, and provides a wire coating composition which may be applied smoothly and at high rates. The blend of the present invention comprises a normally solid free-radical produced, branched polymer of ethylene having a density in the range 0.910 to 0.970 and from 3.1 to 5.3 percent by weight based upon the branched polymer of ethylene of a normally solid polypropylene having a melting point of at least 135° C. and a density in the range 0.870 to 0.920. At least 70% of the polypropylene should be insoluble in refluxing heptane and should have a melting point of at least 160° C. and a density in the range 0.910 to 0.920. For the purposes of this invention, the concentration of the polypropylene in the branched polymer of ethylene is critical to the proper performance of the blends herein.

The blends of the present invention may be prepared in a variety of ways, e.g., by conventional mixing equipment such as a Banbury or Baker-Perkin mixer, heated roll mills and by dissolving the polymers in a common solvent and reprecipitating by the addition of nonsolvent. Preferably, the blending is done concurrently with fabrication, e.g., in an extruder, so that the resin components need only be fed into the extruder simultaneously with the mixing taking place in the melt. Thus, the present blends may be used with little or no change in the normal mechanics of fabrication.

The usefulness of the blends of the present invention is readily apparent in several processing applications. The performance of the blend in the blow-molding in addition to obviating the need for a mold lubricant, in most cases produces molding which exhibits improved see-through transparency and gloss, while at the same time many external defects, e.g., melt fracture, and die-land fracture lines as well as transverse blemish lines, are eliminated.

In practice, the optimum results are realized when the melt viscosities are of the branched polyethylenes and the polypropylenes are similar so as to facilitate mixing in the melt.

The catalysts employed in the preparation of the polypropylene are unusual in that they permit the formation of normally solid, essentially linear, high molecular weight polymers of propylene. Until recently, such polymers were unattainable. The catalysts are comprised of reaction products of the transition metal compounds, and particularly halides of Groups IIIb, IVb, Vb, VIb, of the Periodic Chart of Elements such as is shown on pages 448 and 449 of the Handbook of Chemistry and Physics, 41st Edition, 1959 and organometallic, metallic or metallic-hydride reducing agents. Especially useful in the production of stereoregular polypropylene is a modified coordination catalyst comprised of the reaction products of an organometallic compound containing at least one hydrocarbon radical bonded to the metal and a prereduced transition metal halide from the Groups IVb and Vb of the Periodic Chart of Elements. The prereduction is affected by reducing the metal of the transition metal halide by a valence of one from its maximum valence state by means of an essentially stoichiometric quantity of the organometallic compound containing at least one hydrocarbon radical bonded to metal. Polypropylene having a high degree of stereoregularity may be prepared by extracting the polymer produced by the latter type of coordination catalysts with the appropriate organic solvents to remove the undesirable stereorandom polymer.

The polypropylenes employed in the present invention may be characterized as having a weight average molecular weight of at least 25,000, being at least 70% insoluble in refluxing heptane at atmospheric pressure, having a melting point of at least 160° C. and a density in the range 0.910 to 0.920 for the heptane insoluble fraction, and a melting point of at least 135° C. and a density in the range of 0.870 to 0.920 with the unextracted polymer. Density is measured by standard ASTM–D 792-50. Polypropylenes employed in the present invention differ from those obtained when propylene is polymerized with metal oxide, for the latter polymerization gives rise to low molecular weight resins which have substantially lower melting points and which are not readily compatible with the branched polymers of ethylene. Frequently, the low molecular weight polypropylenes exude from the blend when employed in the concentrations specified in the present application.

The ethylene polymers employed in the present blend are prepared by the conventional, free-radical catalysis techniques and include, e.g., the processes of Fawcett et al., U.S. Patent 2,153,553, issued Apr. 11, 1939, the improvements thereof as shown by Peterson, U.S. Patent 2,425,638, issued Aug. 12, 1947, and the azo-type catalyst of the Hunt et al., U.S. Patent 2,471,959, issued May 31, 1949. The ethylene polymers may be homopolymers of ethylene as well as copolymers of ethylene produced by the free-radical polymerization of mixtures of ethylene and oxygen-containing comonomers, e.g., vinyl esters, vinyl ketones, vinyl ethers, and other vinyl compounds such as the acrylic type. Examples of the ethylene polymers containing various amounts of interpolymerized comonomer are shown in the following patents:

U.S. Patent 2,200,429, issued May 14, 1940 to Perrin et al.
U.S. Patent 2,396,677, issued Mar. 19, 1946 to Brubaker
U.S. Patent 2,396,920, issued Mar. 19, 1946 to Larson.

The ethylene polymers may contain from 0 to 50 percent by weight of comonomer. Especially useful are those branched ethylene polymers prepared from mixtures of ethylene and vinyl acetate, where the vinyl acetate repeat unit comprises, after polymerization, 0.2 to 50 weight percent of the total polymer, and preferably from 2.0 to 30 percent by weight. Since the introduction of the higher quantities of vinyl acetate into the polymer effects a marked change in the normal polymerization conditions and/or an appreciable reduction in molecular weight, the upper limit of interpolymerized vinyl acetate is preferably held to about 15 percent by weight, although for some applications, e.g., where low molecular weight is desirable the upper limit may reach the values specified hereinabove. Preferably, the branched polymers of ethylene employed in the present invention exhibit densities in the range of 0.910 to 0.970.

The following examples are presented to illustrate and not to restrict the present invention. Parts and percentages are by weight unless otherwise specified. It will be apparent from the examples that, although the lower limit of polypropylene is readily ascertained by observance of the roughness of the polymeric coating when applied to wire, the upper limit is not obvious for the degradation in desirable properties is not apparent at the initial application of the polymer to the wire. The increased smoothness of the coating obtained by the addition of greater than 3.1% of polypropylene to the above-described ethylene polymers persist at concentrations above 5.3%; however, the performance of the coating in end-use is markedly reduced at concentrations greater than 5.3% of polypropylene, e.g., the elongation at break decreases rapidly resulting in crackling and brittleness of the coating which adversely affects the performance of the wire in service.

EXAMPLE 1

A #22-gauge copper wire is coated with a branched polyethylene resin having a density of 0.922 and a melt index, as measured by standard ASTM D 1238–57T of 0.17. A 0.010 inch thick coating is applied using a 2½ inch Davis-Standard wire coating extruder, having a ratio of length to diameter of 20 and a triple-tapered die with a final angle of 6° and a 0.390 inch land length. The melt temperature is held at 450°±2° F. while the wire is coated at a rate of 2100 feet per minute. The surface roughness of the wire is measured with a Brush Surfindicator Model BL–110 and found to be rough. Varying amounts of polypropylene having a melt index at 230° C. of 0.78 and a density of 0.905 are dry-blended with the aforementioned branched polyethylene by tumbling and then applied to the wire by extrusion. The following table illustrates the results.

TABLE I

| Polypropylene in Blend (Weight percent) | Wire Roughness (Microinches) |
|---|---|
| 0 | 64 |
| 1.48 | 49 |
| 3.1 | 25 |
| 4.17 | 24 |
| 8.7 | 21 |

Acceptable roughness is realized when a minimum of 3.1% polypropylene is added to the branched polyethylene and persists as more polypropylene is added.

EXAMPLE 2

A #22-gauge copper wire is coated with a branched polyethylene having a density of 0.9187 and a melt index, as measured by ASTM D–1238–57T of 0.07. A 0.0125 inch plastic coating is applied using a two-inch Egan extruder with an Egan crosshead and die having a 0.055 inch opening. Varying amounts of polypropylene having a melt index of 0.39 at 190° C., a density of 0.906 and being 94.8% insoluble in refluxing heptane were extrusion blended with the polyethylene. The melt temperature is held between 242 to 249° C. while the wire is coated at a rate of 1000 feet per minute. Coatings are then stripped from the wire and are tested on an Instron Tensile testing machine at a draw rate of 2 inches per minute. The elongation at break is recorded in the following table.

TABLE II

| Polypropylene in Blend (Weight percent) | Elongation at Break (Percent) |
|---|---|
| 0 | 420 |
| 1.01 | 487 |
| 2.56 | 505 |
| 5.3 | 445 |
| 11.0 | 210 |

Example 2 illustrates that the addition of more than 5.3% polypropylene causes a rapid deterioration in the elongation at break of the finished coating.

EXAMPLE 3

Using a standard extruder equipped for bottle-blowing a conventional branched polyethylene is converted into blown bottles. Some difficulty is encountered in blowing the extruded tube away from the core rod. Unless lubricants are added, the molten polymer has a tendency to adhere to the rod, thus either creating holes and preventing subsequent blowing of the bottles or decreasing the thickness of the tubes so that holes may develop during the blowing. If neither of these situations prevail, a slight adhesion to the core rod may at least result in the formation of blemishes or imperfections in the finished product. When 3.62 percent by weight based upon the ethylene polymer of solid polypropylene is blended into the ethylene polymer, the use of a lubricant-additive is no longer necessary. Furthermore, qualities previously unattainable using only the base resin are achieved, e.g., the gloss and see-through transparency are enhanced and many internal and external surface defects, transverse blemish lines, melt fracture, and die land fracture lines, are limited.

What is claimed is:

A polymeric blend especially adapted for wire coating consisting essentially of a normally solid, free-radical produced, branched polyethylene and 3.1 to 5.3 percent by weight based upon said polyethylene of a normally solid polypropylene having a melting point of at least 135° C. and a density in the range of 0.870 to 0.920, at least 70% of said polypropylene being insoluble in refluxing heptane and having a melting point of at least 160° C. and a density in the range of 0.910 to 0.920.

References Cited

UNITED STATES PATENTS 2,816,883 12/1957 Larchar et al. _____ 260—94.9
2,956,042 10/1960 Underwood et al. ____ 260—897
3,254,139 5/1966 Anderson et al. _____ 260—897

FOREIGN PATENTS 1,316,312 12/1963 France.

OTHER REFERENCES

Modern Plastics, 1966, 43:1A, p. 265 (1965).

SAMUEL H. BLECH, *Primary Examiner.*

MURRAY TILLMAN, *Examiner.*

T. G. FIELD, Jr., E. B. WOODRUFF,
*Assistant Examiners.*